Dec. 11, 1934.　　　　G. W. BROWNLEY　　　　1,984,172
PIPE BEND
Filed April 30, 1932
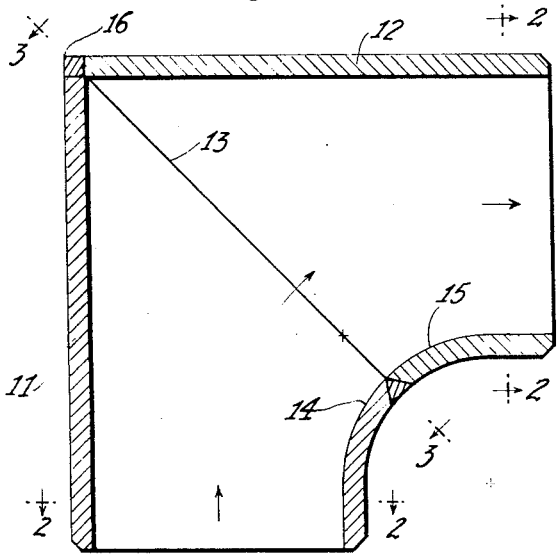
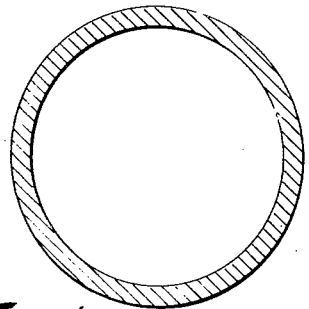
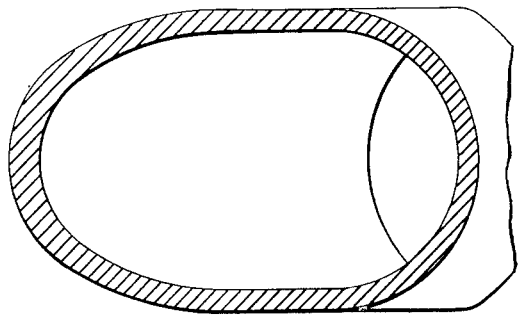
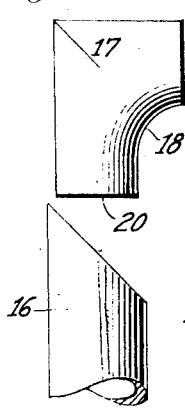
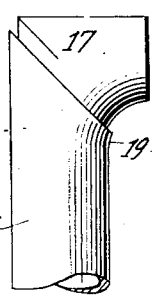
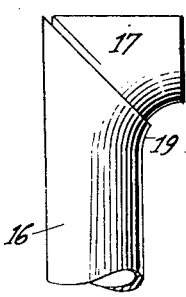
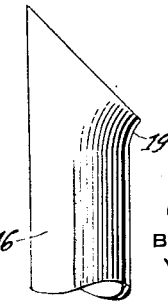
INVENTOR
George W. Brownley
BY
ATTORNEYS Patented Dec. 11, 1934

1,984,172

UNITED STATES PATENT OFFICE 1,984,172

PIPE BEND

George W. Brownley, New York, N. Y.

Application April 30, 1932, Serial No. 608,412

2 Claims. (Cl. 137—75)

This invention relates to welded pipe bends. It is an object of the invention to provide an improved pipe bend which offers a low resistance to the flow of fluid, and which is economical to manufacture and install. It is a further object of the invention to provide an improved method of making welded pipe bends. Other objects and advantages of the invention will appear hereinafter.

The nature and objects of the invention will be better understood from the description of certain illustrative embodiments thereof, and for the purpose of such description reference should be had to the accompanying drawing forming a part hereof, and in which:

Fig. 1 is a sectional view through a welded pipe bend in the plane of the bend;

Figs. 2 and 3 are sectional views substantially on lines 2—2 and 3—3, respectively, of Fig. 1; and Figs. 4, 5, 6 and 7 are views showing, more or less diagrammatically, how the end of a pipe may be prepared for welding to a similarly prepared pipe end to form a bend.

In pipe lines where lengths of pipe are welded together it is customary in making bends to cut the ends of each of two lengths of pipe at an angle such that when the ends are welded together with a peripheral weld the desired change in direction is accomplished. Such bends are relatively easy and inexpensive to make, but because of the angular corners at the bend offer a relatively high resistance to the flow of fluid through the pipe. This objection has long been recognized, and has been partially overcome by substituting for the single weld angular bend a bend known as a fabricated bend, and in which there is a plurality of welded angular bends whose total angular change of direction is equal to the requirement of the installation. Such an arrangement for reducing the resistance to flow at a pipe bend is costly because of the additional cutting and welding required, and also is objectionable because of the large space required to accommodate the bend.

Applicant has found that the resistance of a single weld angular bend to the flow of fluid may be greatly reduced by slightly flaring the angularly cut ends of the pipe before they are welded together, thereby slightly increasing the area of the pipe line and reducing the velocity of flow at the point where the most energy is consumed in friction, that is, at the point of change in direction. This flaring of the pipe ends at the weld provides a smoothly expanded outlet from the normal cross sectional area of the pipe to a maximum area at the weld, and then a smoothly tapering constriction to the normal cross sectional area of the pipe.

Referring to Fig. 1, which shows merely by way of example a 90 degree pipe bend, two sections of pipe 11 and 12 which are to be joined have their ends cut at an angle of 45 degrees. Each of the angularly cut ends is flared or belled slightly on the shorter side of the pipe, as shown at 14 and 15, respectively, so that when the pipes are joined by the peripheral weld 13 the pipe bend has a rounded inner corner 14—15 and an angular outer corner 16. Applicant has found that the shape of the outer corner 16 preferably should be angular substantially as shown, and that a pipe bend having a rounded inner corner and an angular outer corner offers a lower resistance to flow than does either a bend with angular inner and outer corners, or a bend with rounded inner and outer corners and a constant cross section equal to that of the pipe. Figures 2 and 3 show, respectively, the normal section of the pipe and a section through the weld.

It will be seen that the welded pipe bend illustrated in Fig. 1 may be made with a single peripheral weld and that the space required for the bend is substantially the same as that required for the single weld angular bend heretofore used. The small additional space required by the rounded inner corner of the bend is not objectionable in most instances.

Desirably the pipe ends which are to be joined to make the bend are cut and flared before the pipe is shipped to the point of installation. Conveniently, the flaring of the angularly cut ends is done while the pipe is hot, and this operation may be accomplished in the manner illustrated diagrammatically in Figs. 4–6. A block 17 having a round end 20 substantially fitting the inside of the pipe 16 has on one side a flaring portion 18. While the pipe 16 is still hot this block 17 may be forced down into the pipe end with the flaring portion 18 of the block on the shorter side of the pipe 16 so as to flare the pipe wall outwardly as at 19. The completed flared pipe end is shown in Fig. 7, and it will be obvious from the foregoing description that two lengths of pipe as illustrated in Fig. 7 may be joined by a single peripheral weld to provide a 90 degree pipe bend as shown in Fig. 1.

Applicant has provided an improved welded pipe bend which is small, which is inexpensive to manufacture and install, and which offers a low resistance to the flow of fluid through the bend.

The foregoing description of certain descriptive embodiments of the invention is illustrative merely and is not intended as defining the limits of the invention.

I claim:

1. An angular connector fitting for connecting lengths of pipe comprising, in combination, two round tubular elements abutting in a plane disposed at an angle to the transverse axis through each tubular element, each of said tubular elements being flared out laterally on one side only adjacent the abutting ends, the tubular elements being positioned relative to each other to provide the connector with a rounded inner corner and an angular outer corner, and a weld jointing the abutting edges of the tubular elements.

2. An angular connector fitting for connecting lengths of pipe comprising, in combination, two tubular elements abutting in a plane disposed at an angle to the transverse axis through each tubular element, each tubular element being flared out laterally upon its shorter side only to provide the connector with a rounded inner corner and an angular outer corner, and a weld joining the abutting edges of the tubular elements.

GEORGE W. BROWNLEY.